US006082189A

United States Patent [19]

Bayerle et al.

[11] Patent Number: 6,082,189

[45] Date of Patent: Jul. 4, 2000

[54] METHOD OF CHECKING THE OPERATIONAL FUNCTIONALITY OF A TANK VENTING SYSTEM FOR A MOTOR VEHICLE

[75] Inventors: Klaus Bayerle, Regensburg; Michael Henn, Billigheim/Baden; Hong Zhang, Regensburg, all of Germany

[73] Assignee: Siemens Aktiengesellschaft, Munich, Germany

[21] Appl. No.: 09/049,396

[22] Filed: Mar. 27, 1998

[30] Foreign Application Priority Data

Mar. 27, 1997 [DE] Germany ........................... 197 13 085

[51] Int. Cl.[7] ........................ G01M 15/00

[52] U.S. Cl. ........................ 73/118.1

[58] Field of Search ........................ 73/116, 117.2, 73/117.3, 118.1

[56] References Cited

U.S. PATENT DOCUMENTS 5,572,981 11/1996 Pfleger et al. .

5,575,265 11/1996 Kurihara et al. .

FOREIGN PATENT DOCUMENTS

4427688A1 2/1996 Germany .

*Primary Examiner*—Eric S. McCall

*Attorney, Agent, or Firm*—Herbert L. Lerner; Laurence A. Greenberg; Werner H. Stemer

[57] ABSTRACT

The tank venting system is evacuated by the negative pressure prevailing in the intake pipe of the internal combustion engine. A regression calculation, based on a physical model which simulates the pressure variation in the event of a leak in the tank venting system, on the basis of a gas mass flow flowing through an opening, supplies a parameter which describes the curve variation of the pressure during the test for gassing out fuel and during the diagnosis. The parameter contains the information about the leak area and takes into account external influences that interfere with the signal evaluation.

17 Claims, 8 Drawing Sheets

TEST FOR GASSING OUT OF HYDROCARBONS

METHOD OF CHECKING THE OPERATIONAL FUNCTIONALITY OF A TANK VENTING SYSTEM FOR A MOTOR VEHICLE

BACKGROUND OF THE INVENTION

Field of the Invention

The invention relates to a method of checking the serviceability of a tank venting system for a motor vehicle which intercepts fuel vapors and feeds them to an internal combustion engine, for a motor vehicle, the system being based on a negative pressure that is produced in the tank venting system. The monitoring system includes a container which absorbs fuel vapors and which communicates through a venting line with a fuel tank and through a regeneration line with an intake pipe of the internal combustion engine; the container has an air-admittance line that communicates with the atmosphere and which can be closed with a shut-off valve for the purpose of checking the tank venting system. The system further includes a pressure sensor that detects the system pressure of the tank venting system, a tank venting valve disposed in the regeneration line and is opened in order to feed the fuel vapor stored in the container and in order to build up a negative pressure in the tank venting system. The tank venting system is thereby classified as not serviceable at that time if the system pressure does not satisfy a predefined condition when the negative pressure is building up with the tank venting valve open and the shut-off valve closed, or the system pressure does not satisfy a further predefined condition when the negative pressure is decaying with the tank venting valve closed and the shut-off valve closed and, in addition, operating variables of the vehicle, including the internal combustion engine and the tank venting system, are checked and the process is aborted if predefined operating variable values, at which a reliable statement about the serviceability is possible, are not reached.

Such a method is described in commonly assigned U.S. Pat. No. 5,572,981 to Pfleger et al. (German published application DE 44 27 688 A1).

There, a tank venting system for a motor vehicle is checked for its functionality with the aid of a vacuum (negative pressure relative to the atmospheric condition) that is produced in the tank venting system. To this end, the prior art tank venting system includes the following features:

a container which absorbs fuel vapors and is connected via a venting line to a fuel tank and via a regeneration line to an intake pipe of the internal combustion engine, and the container having an air-intake line connected to the atmosphere that can be closed by means of a shut-off valve in order to check the tank venting system;

a pressure sensor that detects the system pressure of the tank venting system;

a tank venting valve which is arranged in the regeneration line and is opened in order to feed the fuel vapor stored in the container and in order to build up a negative pressure in the tank venting system;

the tank venting system is classified as not serviceable at that time if the pressure gradient lies below a threshold when the negative pressure is building up (negative pressure build-up test) or the pressure gradient lies above a further threshold when the negative pressure is decaying (negative pressure decaying test) and, in addition, operating variables of the vehicle, including the internal combustion engine and the tank venting system, are checked and the method is in each case aborted if predefined operating variable values, at which a reliable statement about the serviceability is possible, are not reached. While the entire method is being carried out, the dynamic behavior of the pressure variation in the tank venting system is also monitored, for which purpose chronologically successive pressure values are registered, the average of the two pressure values is formed from these and the method is aborted if the magnitude of the difference between the average and the current pressure value lies outside a predefined dynamic range.

SUMMARY OF THE INVENTION

It is accordingly an object of the invention to provide a method of checking the functional operability of a tank venting system for a motor vehicle, which overcomes the above-mentioned disadvantages of the prior art devices and methods of this general type and which is further improved so that, even given very small leaks, erroneous diagnoses because of noise and disturbance to the signal to be evaluated are ruled out as far as possible, and external physical influences, such as tank fill level, ambient pressure and ambient temperature can also be taken into account during the diagnosis.

With the foregoing and other objects in view there is provided, in accordance with the invention, a method of checking a functional operability of a tank venting system of an internal combustion system of a motor vehicle, the tank venting system including:

a container for absorbing fuel vapors communicating via a venting line with a fuel tank and via a regeneration line with an intake pipe of an internal combustion engine, and the container having an air intake connected to atmosphere and which is closeable by means of a shut-off valve for checking the tank venting system;

a pressure sensor detecting a system pressure of the tank venting system;

a tank venting valve in the regeneration line, the tank venting valve being selectively opened for feeding the fuel vapor stored in the container and for build up a negative pressure in the tank venting system;

the method which comprises:

temporarily classifying the tank venting system as not serviceable if the system pressure does not satisfy a predetermined condition when a negative pressure is increasing in the system with the tank venting valve open and the shut-off valve closed; or the system pressure does not satisfy a further predetermined condition when the negative pressure is decaying with the tank venting valve closed and the shut- off valve closed;

checking operating variables of the motor vehicle, including operating variables of the internal combustion engine and the tank venting system; and aborting the diagnosis if predefined operating variable values are not attained at which a reliable statement about a functional operability of the system is possible;

registering chronologically successive pressure values and using the successive pressure values as input variables for a physical model which simulates a pressure variation in the event of a leak in the tank venting system based on a gas mass flow flowing through an opening, and forming a parameter with the physical model which describes a curve variation of the pressure during the diagnosis and which contains information about a leak area;

comparing a leak area with a given threshold value; and evaluating a tightness of the tank venting system on the basis of a result obtained in the comparing step.

By means of a regression calculation, based on a physical model which simulates the pressure variation in the event of a leak in the tank venting system, on the basis of a gas mass flow flowing through an opening, and which supplies a parameter which describes the curve variation of the pressure during the test for gassing out fuel and during the diagnosis, and which contains the information about the leak area, it is possible in a straightforward way to assess the tank venting system with respect to its tightness with great accuracy.

Due to the fact that the method according to the invention does not evaluate any point-to-point pressure differences (pressure gradients), which are very susceptible to interference because of the signal noise, but instead a single pressure parameter is ascertained by means of a differential equation which describes the entire curve variation and takes into account all the disturbing influences within the measured variable, the method is relatively insensitive.

Using the method, it is possible both for external influences, such as different tank filling levels, ambient temperature, ambient pressure, zero-point displacement of the signal from the pressure sensor, and disturbances on the signal (noise) to be taken into account. This allows even very small leaks in the tank venting system, down as far as the order of magnitude of 0.5 mm leak diameter, to be detected with great accuracy.

In accordance with an added feature of the invention, the physical model contains a differential equation for the pressure variation of the form $$d\dot{p} = -\frac{\alpha\cdot A}{V}\cdot\sqrt{\frac{2\cdot\rho_{0,air}\cdot p_0\cdot T_0\cdot p_u}{\rho^2_{0,mix}\cdot T}}\cdot\sqrt{dp}$$

and the method further comprises separating variables and transforming the differential equation into a linear representation in parameters of the form $$\sqrt{|dp|} = -b_1 t + b_0$$

and ascertaining a diagnostic parameter from the measured pressure variation, with a regression calculation:

$$b_1 = \frac{-6}{T_A N(N+1)(N-1)}[2\Sigma_{ny} - (N-1)\Sigma_y] \text{ with}$$

$$\Sigma_y = \sum_{n=0}^{N-1}\sqrt{|dp(nT_A|} \text{ and } \Sigma_{ny} = \sum_{n=0}^{N-1} n\cdot\sqrt{|dp(nT_A)|}$$

where:

A=actual cross section;

T=temperature of the gas volume;

$T_0$=standard temperature;

α=throttling coefficient;

V=gas volume;

$P_u$=ambient pressure;

$P_0$=standard pressure;

$P_{0,air}$=density of air under standard conditions;

$P_{0,mix}$=density of the fuel vapor under standard conditions;

N=number of sampling steps;

n=current sampling step;

$T_A$=sampling time.

In accordance with an additional feature of the invention, prior to processing in the physical model, the pressure values supplied by the pressure sensor are corrected by a value which takes into account a zero-point displacement of the pressure signal.

In accordance with another feature of the invention, prior to building the negative pressure in the tank venting system with the tank venting valve closed and the shut-off valve closed, a correction parameter is determined with the aid of the physical model, the correction parameter describing a pressure variation during an out-gassing of fuel, and inputting into the model the pressure values corrected by a zero-point offset and displaced into a negative pressure range by a correction value.

In accordance with again an added feature of the invention, the following further steps are provided:

comparing the correction parameter with a first threshold value and aborting the method due to excessively severe gassing out of fuel, if the correction parameter lies above the first threshold value;

otherwise comparing the correction parameter with a second threshold value and aborting the method and indicating an incompletely closed tank venting valve if the correction parameter lies below the second threshold value; and storing the correction parameter for further processing if the correction parameter lies above the second threshold value.

In accordance with again a further feature of the invention, the correction value and the threshold values are determined empirically.

The following additional steps are provided:

forming an effective diagnostic parameter from a diagnostic parameter and a correction parameter;

calculating an effective leak area from the diagnostic parameter;

comparing the effective leak area with a predefined threshold value; and deducing that a leak is present in the tank venting system if the threshold value is exceeded.

The afore-mentioned calculating step means that the effective leak area is calculated in accordance with the following relationship:

$$A_{ef} = bIDIAG\cdot V\cdot C_0\cdot\sqrt{\frac{T}{\cdot p_u}}$$

where $C_0$ is an applicable constant, blDIAG is the effective diagnostic parameter formed by subtracting the correction parameter from the diagnostic parameter, V is a gas volume, T is a temperature of the gas volume, and $P_u$ is the ambient pressure.

The applicable constant may be calculated in accordance with the following rule:

$$C_0 = \frac{1}{\alpha} \cdot \sqrt{\frac{2 \cdot \rho_{0,mix}^2}{\rho_{0,air} \cdot p_0 \cdot T_0}}$$

where $\alpha$=throttling coefficient;

$\rho_{0,air}$=density of air under standard conditions;

$\rho_{0,mix}$=density of the fuel vapor under standard conditions;

$T_0$=standard temperature; and $\rho_0$=standard pressure.

In accordance with yet a further feature of the invention:

a degree of loading defined by a proportion of volatile fuel in an active carbon filter in the container is ascertained as an operating variable;

the tank venting valve and the shut-off valve are opened for a time which depends on the degree of loading, and a flushing operation is carried out;

subsequently to the flushing operation and during a predetermined interval, a maximum pressure and a minimum pressure in the tank venting system are registered; and the process is aborted if a difference between the maximum pressure and the minimum pressure exceeds a predefined limit value.

The negative pressure in the tank venting system may be produced with the shut-off valve closed, by opening the tank venting valve step by step. Preferably, the tank venting valve is opened along a ramp function with a predefined slope.

The method further comprises:

opening the tank venting valve for a predefined time;

checking whether, within the predefined time, the pressure in the tank venting system has reached a diagnostic negative pressure value, starting from a starting value, and if the condition in the checking step is satisfied and no infringement has occurred during the predefined time of a lambda controller threshold in a lambda control device of the internal combustion engine, abruptly closing the tank venting valve. If, on the other hand, the lambda controller threshold is infringed, the tank venting valve is closed step by step so as to avoid a sudden weakening of a fuel/air mixture fed to the internal combustion engine, and the process is aborted.

If the diagnostic negative pressure has not been reached within the predefined time and no infringement of the lambda controller threshold of the lambda control device has taken place: the pressure in the tank venting system after the predefined time has elapsed is registered; it is determined whether the pressure drop was greater or smaller than a minimum pressure value; it is concluded that a medium-sized leak is present in the tank venting system if the pressure has fallen by the minimum pressure value; and, otherwise, it is concluded that a very large leak is present in the tank venting system, that the tank venting valve is jammed in a closed state, that the shut-off valve is jammed in the open state, and/or that the tank cover is missing; and the type of fault thus detected is output to a fault memory of an electronic control device of the internal combustion engine.

In addition, the type of fault or the occurrence of a fault may be communicated to the driver of the motor vehicle, either by an audible alarm or by a visual indicator.

Other features which are considered as characteristic for the invention are set forth in the appended claims.

Although the invention is illustrated and described herein as embodied in a method of checking the serviceability of a tank venting system for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
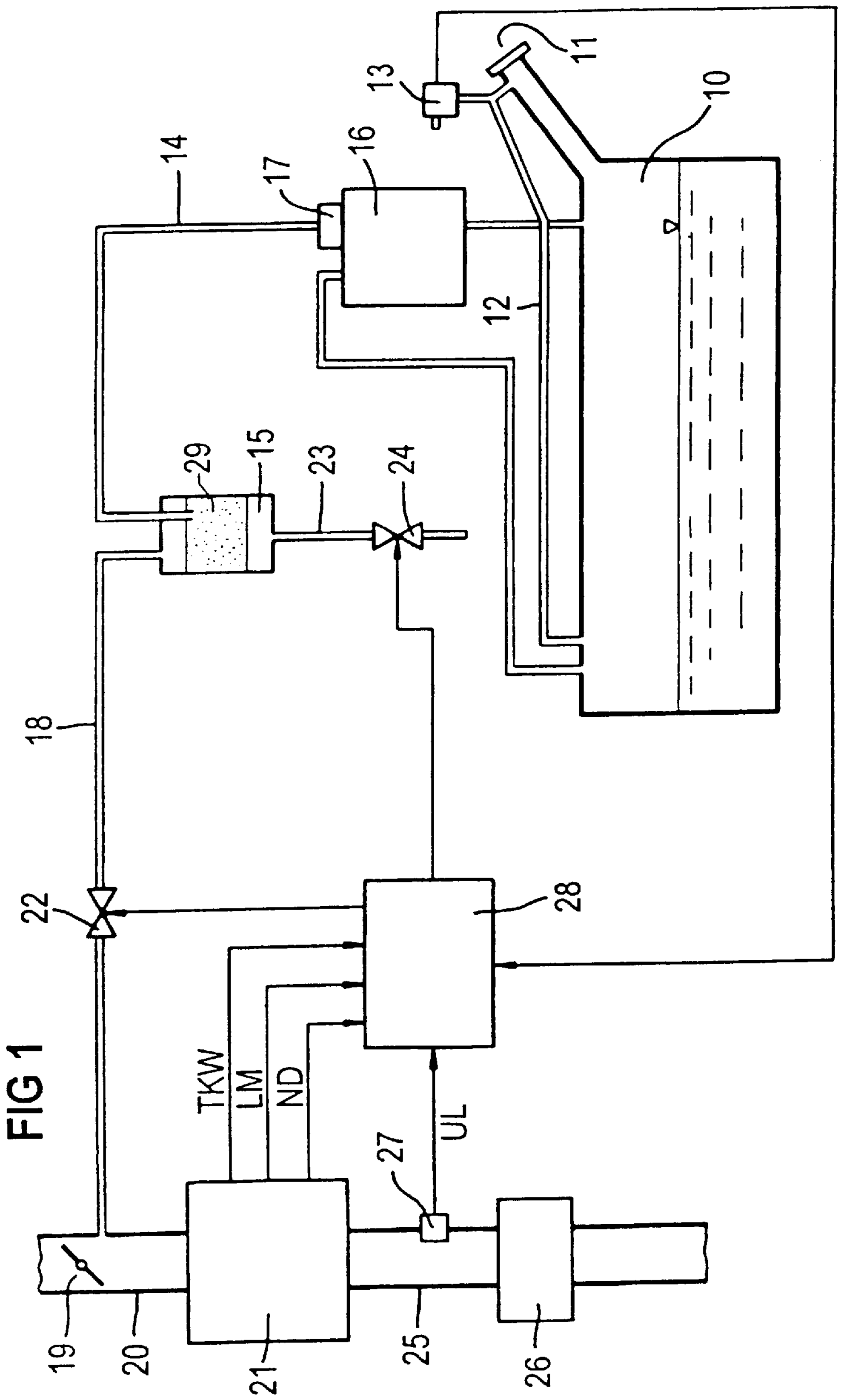
FIG. 1 is a schematic illustration of an internal combustion engine with a tank venting system and an electronic control device for checking the functional operability of the tank venting system.

Referring now to the figures of the drawing in detail and first, particularly, to FIG. 1 thereof, there is seen a tank venting system for a motor vehicle in simplified form. A fuel container 10 has a filling nozzle (not designated specifically) which can be hermetically closed by a tank cover 11. Branching from this filling nozzle, in the vicinity of its filling opening, is a tank-filling venting line 12. The line 12 also opens into the fuel container 10 at a point that is located further remote from the filling nozzle. The fuel vapor that forms during the tank-filling operation can flow back upward in this tank-filling venting line, so that the fuel container 10 can be completely filled with fuel.

The line 12 is also connected to a first connector of a differential pressure sensor 13. A further connector of the sensor 13 communicates with the atmosphere. However, for the novel method of checking the functional operability of the tank venting system, it is of no significance that the differential pressure sensor 13 is arranged exactly at the point indicated in FIG. 1. Instead, it is possible to insert the sensor 13 at any desired point within the tank venting system. In addition, instead of a differential pressure sensor, it is also possible to use a sensor that measures the absolute pressure in the tank venting system.

The fuel container 10 is connected, via a venting line 14, to a container 15, which contains an active carbon filter (AKF) 29 and in which the hydrocarbon vapors gassing out from the fuel container 10 are adsorbed. A balancing container 16 is provided in the venting line 14, between the container 15 and the fuel container 10. The balancing container 16 has an integrated tank protection valve arrangement 17. This ensures, on the one hand, that it is also not possible for any liquid fuel to pass directly into the container 15 and hence into the active carbon filter 29, if, for example, the fuel container 10 is completely full or the vehicle comes to rest on its roof (roll over) as a result of an accident and, on the other hand, the complete tank venting system is protected against the occurrence of an impermissibly high negative pressure or positive pressure on account of malfunctioning components of the tank venting system, both during a flushing operation and during the checking method.

A regeneration line 18 originates from the container 15, downstream of a throttle 19 (as seen in a flow direction from the filter 15 to the engine). The line 18 opens into an intake duct 20 of an internal combustion engine 21. A flow control valve 22 is disposed in the regeneration line 18. The valve 22 will be referred to below as a tank venting valve (TEV). Provided on the underside of the container 15 is an air-admittance line 23, which is connected to the ambient air and can be shut off by means of an electromagentic active-carbon filter shut-off valve (AAV), referred to below in simplified form as shut-off valve 24.

Provided in an exhaust-gas duct 25 of the internal combustion engine 21 is a three-way catalytic converter 26 and, upstream of the latter, an oxygen sensor in the form of a lambda probe 27. Depending on the proportion of oxygen in the exhaust gas, the $\lambda$ sensor outputs a signal UL to an electronic control device 28 of the internal combustion engine 21. Further control parameters that are needed for the operation of the internal combustion engine, such as the rotational speed ND, the temperature of the coolant TKW and the air mass LM taken in, for example, are registered by suitable sensors and also supplied to the control device 28.

These parameters are then further processed in such a way that, inter alia, the load state of the internal combustion engine 21 is determined and, if required, flushing of the active carbon filter 29 or a checking routine for the tank venting system can be initiated.

Such a checking routine will now be described in rough steps with reference to the flow diagram according to FIG. 2. The individual method steps S2.4 to S2.6 will subsequently be discussed in more detail with reference to FIGS. 3 to 8.

The checking of the tank venting system is performed by means of a test negative pressure which is produced by opening the tank venting valve 22 in the idling state of the internal combustion engine. The fuel tank 10 is evacuated via the active carbon filter 29 with the aid of the intake pipe negative pressure, which is relatively high when the internal combustion engine is idling. In the process, it may occur that, in the event of a saturated active carbon filter, a rich mixture is introduced into the intake pipe via the tank venting valve 22, which is now open. The lambda integrator of the lambda control device, which is adapted to be very slow in idling operation of the internal combustion engine, may detect a sudden accumulation of hydrocarbons as a result of the rich mixture only relatively late, and there is the risk that the internal combustion engine will stop. In order to avoid this, the degree of saturation of the active carbon filter, which is ascertained during the normal tank venting function, that is to say during the flushing operation of the active carbon filter, is taken into account.

In a first method step S2.0, the degree of loading of the active carbon filter 29, often also referred to as the degree of saturation, is therefore determined. Depending on the degree of loading that is ascertained, flushing times of different lengths of the active carbon filter are initiated in part-load operation of the internal combustion engine, before the checking of the tank venting system for tightness can be carried out (method step S2.1). In this case, the flushing time at a high degree of loading is longer than at a low degree of loading. This avoids the situation where the active carbon filter has an excessively high degree of loading before the beginning of the check, and the result of the check is falsified.

Ascertaining the degree of loading of the active carbon filter can be carried out in any desired manner, for example as described in the above-mentioned U.S. Pat. No. 5,572,981, which is hereby incorporated by reference.

The checking routine is only enabled if specific enable conditions are satisfied. To this end, in method step S2.2, a check is made as to whether the internal combustion engine is idling and the speed of travel is equal to zero. In addition, the internal combustion engine must have reached a minimum temperature, which is detected by comparing the currently measured coolant temperature with a predefined limiting value.

If a low loading of the active carbon filter 29 is detected, and if the enable conditions are satisfied, then, by way of a marker C, a method step S2.3 is reached in which an examination is made as to whether pressure fluctuations in the fuel tank can falsify the checking result and whether the absolute tank pressure or the differential pressure in relation to the atmosphere has reached a stable level.

Under certain circumstances, it is possible for a relatively high negative pressure to prevail in the fuel tank, on account of the preceding flushing of the active carbon filter during part-load operation of the internal combustion engine.

In order to detect whether the pressure is still rising, a gradient evaluation is carried out over a specific evaluation period (e.g. 1 second) with the tank venting valve closed. The tank pressure counts as equalized when the gradient of a plurality of successive evaluation periods (e.g. 3 periods) no longer rises monotonically or is less than a predefined minimum value. The gradient evaluation can be carried out in accordance with several methods, for example by means of forming the difference of the pressure averages of two successive evaluation periods (sampling of the individual pressure values, for example every 50 ms).

In order to check whether the pressure fluctuations lie in a range that is permissible for the diagnosis, the maximum and minimum value of the pressure is determined in each evaluation period in parallel with the above-mentioned gradient evaluation. To this end, the pressure in the tank venting system is measured continuously during the evaluation period with the aid of the differential pressure sensor 13, and the maximum and minimum pressure that occurs is ascertained. If the difference between these two values lies within a defined measurement window, then a correct starting pressure for the following measurements can be obtained, and a test for the gassing out of hydrocarbons follows in method step S2.4.

If the pressure fluctuations in method step S2.3 are too large, however, a test condition counts as not satisfied, and the pressure fluctuations are ascertained once more. This is repeated until the pressure difference lies within the permissible measurement window.

Since the pressure sensor has a certain offset, the zero-point displacement of the sensor signal is determined before the test for the gassing out of hydrocarbons. This can be carried out, for example, with the aid of the pressure average MW over the last evaluation period:

$$dPoffset=dPmeas_{MW}$$

For the further calculations, the signal from the tank pressure sensor dPmeas is then corrected by this value dPoffset:

$$dP=dPmeas-dPoffset$$

with dP as the corrected value.

Before the actual negative pressure test, a check is made, in method step S2.4, as to whether a negative pressure may be produced in the fuel tank. Since fuel vapor, for example caused by the action of heat in the tank venting system, can constitute a further source of interference during the assessment of the functional operability of the system, the checking routine is terminated in the event of excessively severe gassing out, and the process is put on hold until the degree of loading is ascertained once more, together with a subsequent flushing operation, according to method steps S2.0 and S2.1. In method step S2.4, it is also detected, on the basis of pressure measurements, whether the tank venting valve 22 jams in the open or partly-open state and, for this reason, the diagnosis is aborted and the method begun once more at method step S2.0.

If no gassing out of fuel occurs in method step S2.4, or if the quantity of fuel gassed out lies below a predefined limiting value, then a negative pressure is produced in the tank venting system, in method step S2.5, by opening the tank venting valve. If the pressure in the system does not sink by a specific amount within a predefined time, then the check is terminated with a fault entry, and the method is terminated for this engine run (marker G). The tank venting function is then enabled (method step S2.7). However, if any infringement of the thresholds of the lambda integrator of the lambda control device takes place within this time, then the method is continued once more with the method step S2.0.

Otherwise, a method step S2.6, in which a check is made as to whether the negative pressure built up in the tank venting system is decaying in accordance with a predefined manner (negative pressure decay test), is reached via a marker F. Depending on the result of this check, it is concluded either that there is a leak in the tank venting system or that the tank venting system is intact.

In both cases, the tank venting function is enabled, and the checking method is terminated, in the following method step S2.7.

In order to separate out pressure values which could lead to erroneous detection in the event of a noisy pressure variation in the fuel tank, brought about by slamming a vehicle door or sharp braking of a slowly rolling vehicle, the dynamic behavior of the pressure variation is monitored during the entire method sequence. To this end, the term "limited pressure variation dynamics" is introduced. Firstly, the average $P\_MW_i$ from the current pressure value $P_i$ and the last pressure value $P_{i-1}$ is formed:

$$P\_MW_i = \frac{P_i + P_{i-1}}{2}$$

The limited dynamics are satisfied if the magnitude of the difference between the average $P\_MW_i$ and the current pressure value $P_i$ is less than a predefined value, referred to below as the dynamic window value P_DYF.

$$|P\_MW_i - P_i| < P\_DYF$$

Figure 2:
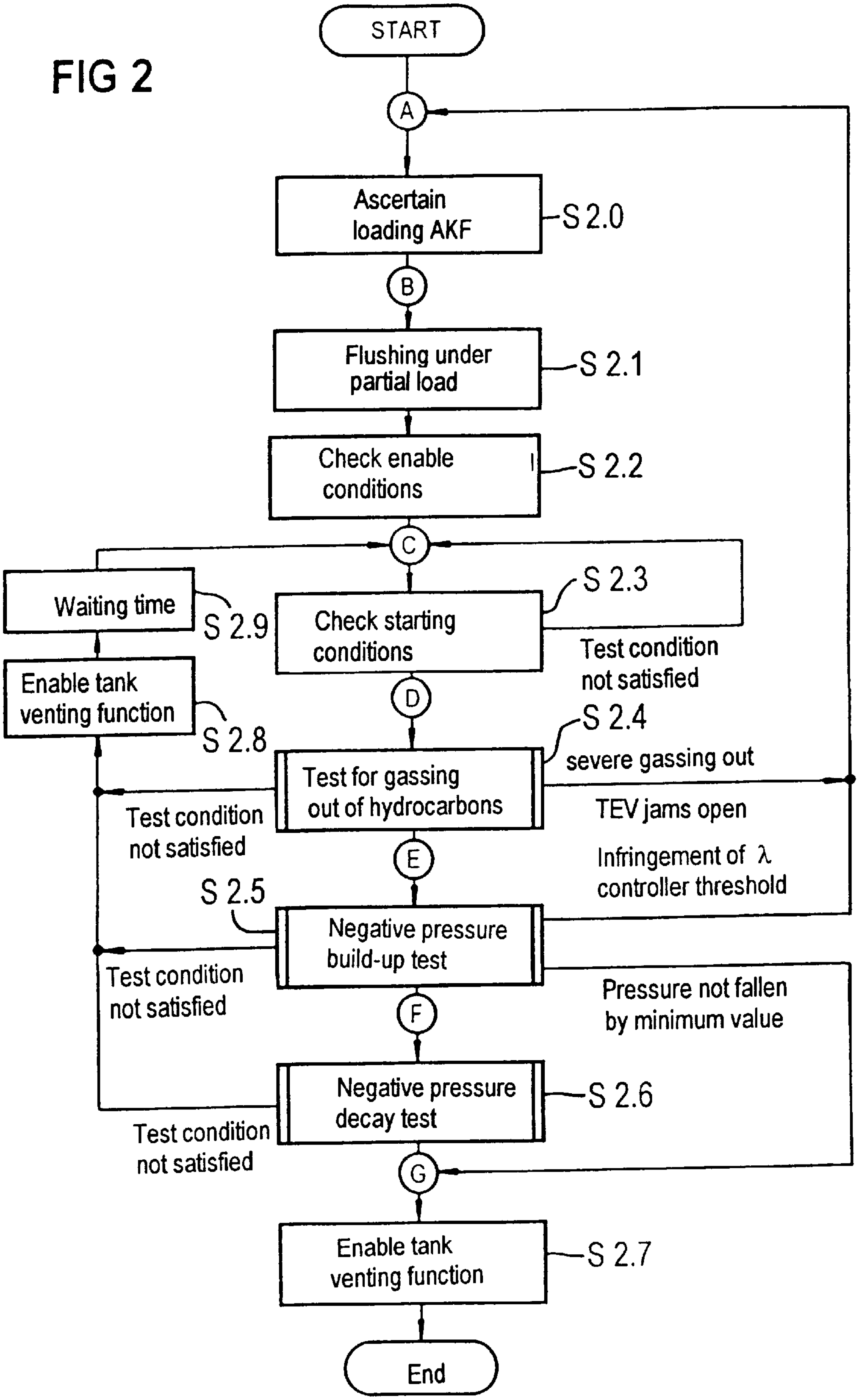
FIG. 2 is a flow chart illustrating a complete method sequence for checking the functional operability of the tank venting system.

For the method steps S2.4, S2.5 and S2.6 that are indicated in FIG. 2, it is possible for different dynamic window values to be defined, the dynamic window values P_DYF being selected to be smaller during the negative pressure decay test (method S2.6) and during the test for the gassing out of hydrocarbons (method step S2.4) in relation to the dynamic window value during the negative pressure build-up test (method step S2.5).

If an infringement of the limited dynamics occurs during the processing of this method step, then the checking is aborted and it is necessary to wait until the pressure relationships in the tank have stabilized before starting a new check. The tank venting function is therefore enabled in method step S2.8 and subsequently, in method step S2.9, a wait is made for an applicable time (waiting time T_WAIT), and the method is continued at the marker C.

However, the statement "test conditions not satisfied" in the method steps S2.3 to S2.6 in FIG. 2 not only contains the abort criterion "limited dynamic pressure variation", but further abort criteria. If, during the testing of the tank venting system, diagnostic errors occur during the ascertaining of the rotational speed or coolant temperature or, respectively, faults in the components tank venting valve, lambda controller, throttle, tank pressure sensor or shut-off valve, then a change is made into the waiting time state (method step S2.9), just as in the case of an abort via the limited dynamics. This also occurs if, during a running check routine, the idling engine operating state is left or the speed of the vehicle exceeds a threshold value.

If the checking of the tank venting system is aborted because the pressure rise during the test for gassing out of fuel (method S2.4) is greater than a limiting value, or the lambda controller value changes more than a predefined value during the production of the negative pressure (negative pressure build-up test, method step S2.5), then before the next check, a wait is made until a new degree of loading is ascertained (method step S2.0).

Figure 3:
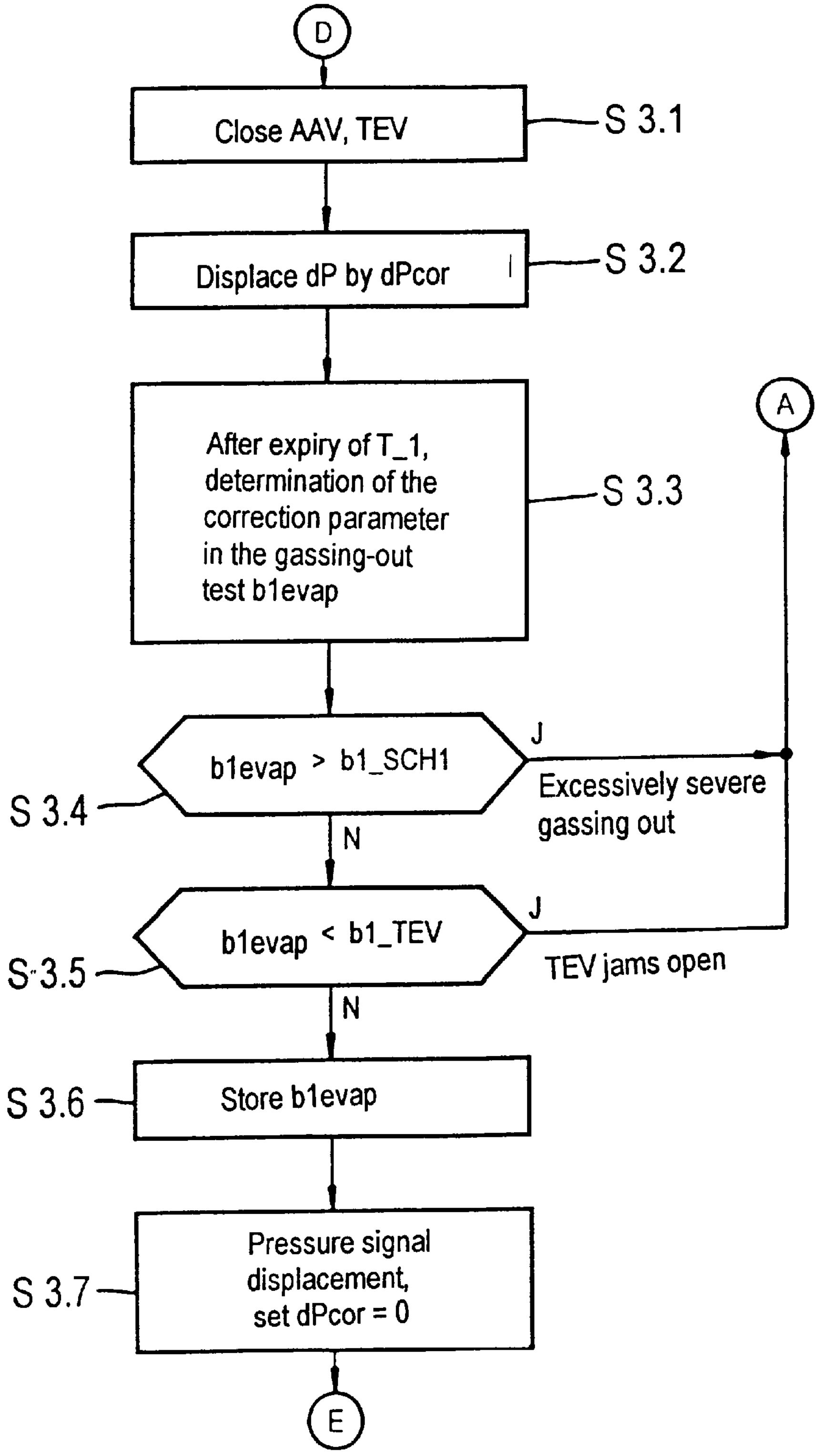
FIG. 3 is a flow diagram showing a detail of the flow diagram of FIG. 2, relating to the test for out-gassing hydrocarbons.

The method step S2.4 (test for gassing out of hydrocarbons) comprises the part steps S3.1 to S3.7 (FIG. 3). Firstly, both the shut-off valve 24 (AAV) and the tank venting valve 22 (TEV) are closed (method step S3.1), and a start is made on ascertaining the pressure variation parameter. As a result of fuel gassing out, a pressure rise is obtained similar to that in the event of the presence of a leak in the tank venting system. Therefore, in method step S3.2, the value of the tank pressure dP, corrected by the sensor offset, is displaced into the negative pressure range by a value dPcor. The value for dPcor is determined empirically.

After the expiration of an adjustable time T_1, in method step S3.3 a correction parameter blevap in the gassing out test is determined. The estimation of this correction parameter will be explained in more detail later with reference to FIGS. 7 and 8. In method step S3.4, the correction parameter blevap is compared with a first, applicable threshold value b1_SCH1. If the value blevap lies above the defined threshold value b1_SCH1, then the check is aborted, since there is excessively severe gassing out of fuel present, and this constitutes a possible source of disturbance in the evaluation of the check results.

Method step S2.0 is reached once more via the marker A, and a degree of loading is re-ascertained.

However, if the query in method step S3.4 supplies a negative result, that is to say the value blevap lies below the threshold value b1_SCH1, then a check is made in method step S3.5 as to whether the value also lies below a second threshold value b1_TEV. If the pressure in the tank venting system falls below this value during the time T_1 it can be recognized from this that the tank venting valve 22 cannot be completely closed, but jams in the open state or at least in the part-open state, although in method step S3.1 the tank venting system should have been tightly sealed by driving the tank venting valve 22 in the “close” direction. The check is aborted, in a manner similar to that if there is a positive result to the query in method step S3.4, and the degree of loading is re-ascertained in accordance with method step S2.0.

If the parameter blevap lies above the second threshold value b1_TEV, then in method step S3.6 the parameter blevap is stored and then, in method step S3.7, the pressure signal displacement dPcor is set to the value 0. The method is continued with the negative pressure build-up test (marker E, method step S2.5).

Figure 4:
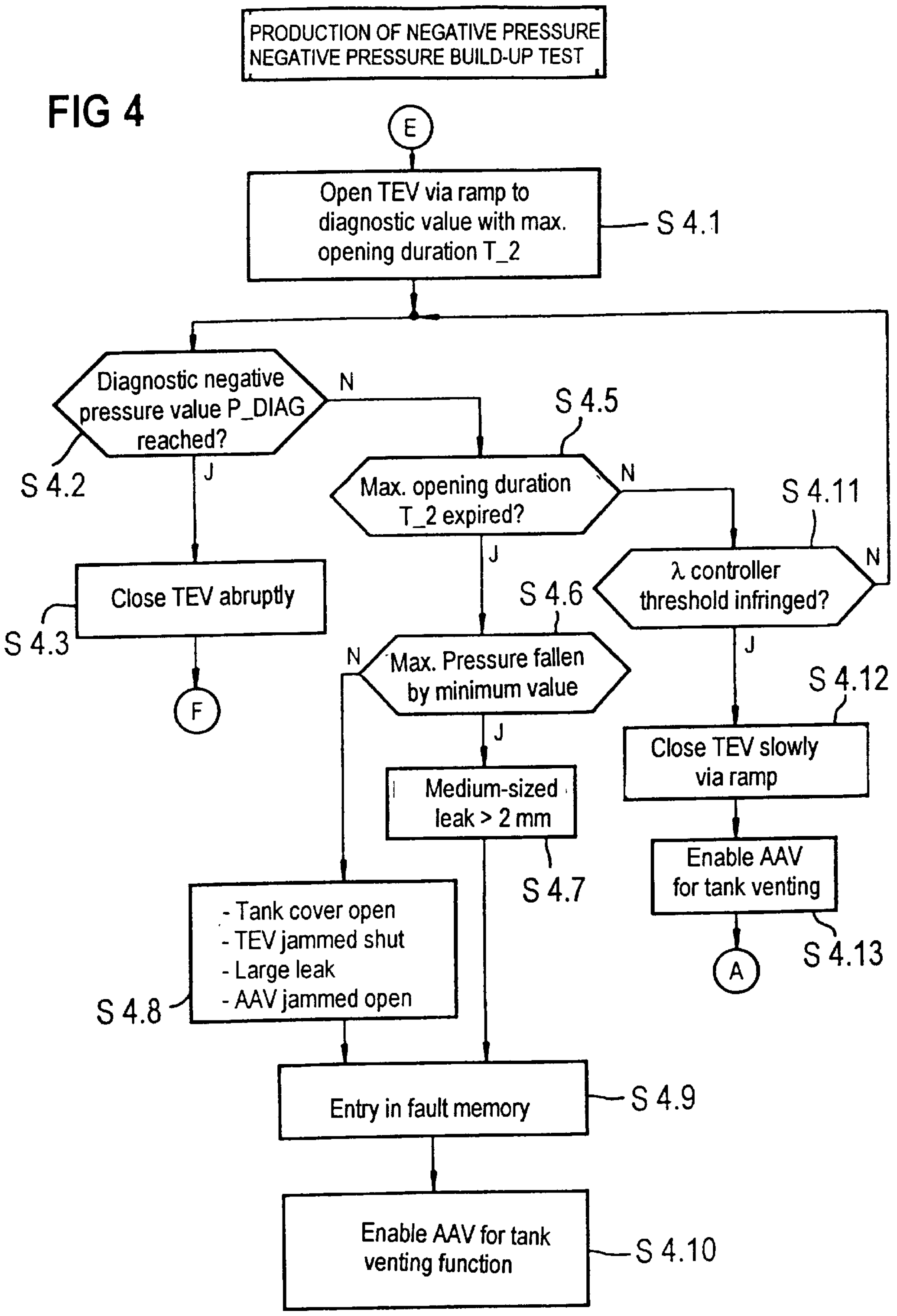
FIG. 4 is a flow diagram showing a detail of the flow diagram of FIG. 2, relating to the formation of the negative pressure and the negative pressure build-up test.
Figure 5:
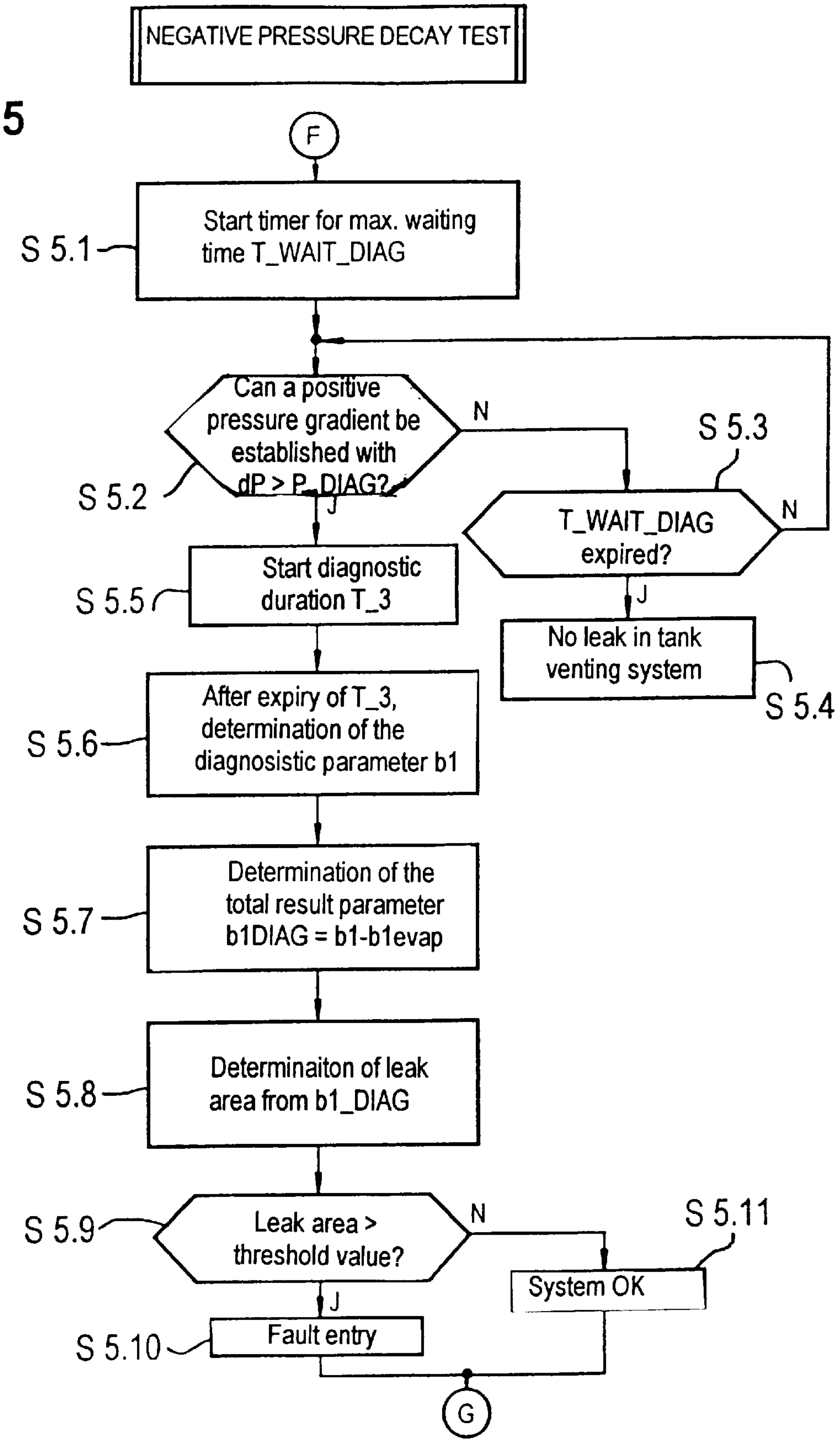
FIG. 5 is a similar view, relating to the negative pressure decay test (diagnosis)

If, therefore, neither excessively severe gassing out of the fuel nor a tank venting valve jamming open is established, and if in addition all the test conditions are still satisfied, then a check is made as to whether a negative pressure can be built up (FIG. 4). Whereas the shut-off valve 24 remains closed in method step S4.1, the tank venting valve 22 is driven, by means of a signal from the electronic control device 28, in such a way that the passage cross section of the regeneration line 18 is continuously increased up to a predefinable diagnostic value. The step by step enlargement of the passage cross section is carried out, for example, by driving the tank venting valve 22 by means of a ramp function. This avoids the situation where a hydrocarbon surge, possibly triggered from the active carbon filter via the open tank venting valve 22, is fed too suddenly to the combustion process of the internal combustion engine, which could lead to the internal combustion engine dying or to a briefly worsened exhaust-gas behavior thereof.

The negative pressure prevailing in the intake pipe is propagated, via the open tank venting valve, in the entire tank venting system, as far as the fuel tank. If, starting from the starting pressure, the pressure falls within the opening duration T_2 of the tank venting valve to such an extent that a predefined diagnostic negative pressure value P_DIAG is reached (query in method step S4.2), then the tank venting valve 22 is abruptly closed in method step S4.3, and the method reaches method step S2.6 (FIG. 2) via a marker F.

If the result of the queries in the method steps S4.2 and S4.5 is that the predefined diagnostic negative pressure P_DIAG was not reached, although the time T_2 has already elapsed, then it is obviously not possible for a negative pressure that is adequate for the test to be built up in the tank venting system. In order to be able to estimate the cause of this, at least roughly, a check is made in method step S4.6 as to whether the pressure drop achieved is more or less than a minimum pressure value. The minimum pressure value is selected such that, when this value is reached, it is concluded in method step S4.7 that there is a medium-sized leak (e.g. >2 mm), otherwise it is concluded in method step S4.8 that there is a large leak, a missing closure cover on the fuel tank or a tank venting valve that jams in the closed state. In both cases, an entry is made in a fault memory of the electronic control device (method step S4.9). In addition, the result can also be reported acoustically and/or optically to the driver of the vehicle. Subsequently, in method step S4.10, the shut-off valve 24 is opened once more and the tank venting function is enabled. Since a negative pressure needed for checking the tank venting system could not be produced, the routine is thus completed.

If an infringement of the thresholds of the lambda integrator of the lambda control device takes place during the opening duration T_2 of the tank venting valve (method step S4.11), that is to say, during the negative pressure build-up test (intake) the lambda controller value changes by more than a predefined value since the start of the intake, then the check is aborted and the tank venting valve is slowly closed once more step by step (method step S4.12).

If the tank venting valve were to be closed without limiting the change (for example closed abruptly), then there would be the risk of the fuel/air mixture being suddenly weakened and the internal combustion engine dying.

The shut-off valve 24 is then opened and the tank venting function is enabled (method step S4.13). If the negative pressure build-up test was completed successfully (method step S2.5), then the method step S2.6 “negative pressure decay test” (diagnosis, FIG. 5) is reached via the marker F. Method step S2.6 comprises the part steps S5.1 to S5.11. In method step S5.1, a timer for a maximum waiting time T_WAIT_DIAG is started. After the tank venting valve has been closed, it may occur, depending on the configuration of the tank venting system, that the tank pressure dP falls still further. The pressure evaluation of the pressure rise is therefore only carried out as soon as the tank pressure dP is once more located with a positive pressure gradient above the switch-off pressure P_DIAG (query in method step S5.2). The tank venting system is therefore diagnosed as being tight if, following the expiration of the waiting time T_WAIT_DIAG after the closure of the tank venting valve, there is still no positive pressure gradient above P_DIAG (method steps S5.3 and S5.4).

If the result of the query in method step S5.2 is a positive result, a diagnostic time T_3 is then started (method step S5.5). After the expiration of the diagnostic time T_3, the effective pressure rise with gassing-out correction is ascertained. To this end, a diagnostic parameter b1, which describes the entire curve variation of the tank pressure during the negative pressure decay test, is determined in method step S5.6. In method step S5.7, an effective diagnostic parameter b1_DIAG is ascertained from this diagnostic parameter b1 and the correction parameter in the gassing-out test blevap. Then, in method step S5.8, the leak area is determined from the effective diagnostic parameter b1_DIAG, and this area is compared with a predefined threshold value (method step S5.9). If the leak area is greater than the threshold value, then it is concluded that there is a leak in the tank venting system, and a fault entry in a fault memory is carried out in method step S5.10, otherwise the tank venting system is classified as fault-free at that time, that is to say as tight (method step S5.11). Irrespective of whether or not a fault has occurred, a method step S2.7, in which the shut-off valve is opened, the check is barred for this engine run and the tank venting function is enabled, is reached via the marker G.

Figure 6:
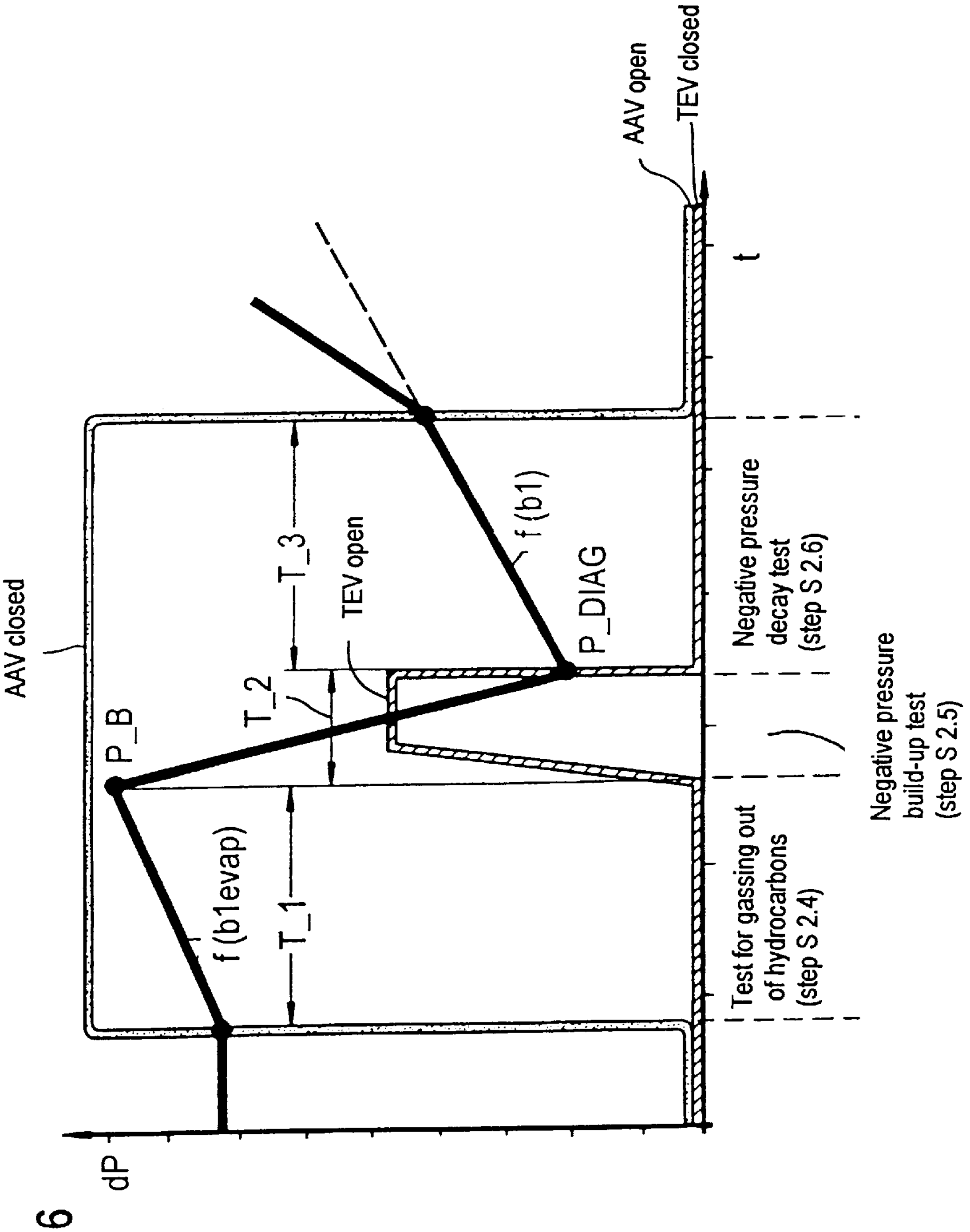
FIG. 6 is a diagrammatic chart indicating a time variation of the pressure in the tank venting system during selected method steps.

The pressure variation over time in the tank venting system during the method steps S2.4 to S2.6 is drawn qualitatively, using a continuous line, in the diagram according to FIG. 6. Also illustrated are the times during which the tank venting valve and the shut-off valve are open and closed, respectively (T_1, T_2, T_3).

In the purely qualitative illustration of the pressure relationships during the individual checking steps according to FIG. 6, the simplification has been made that, following the closure of the tank venting valve in method step S4.3, the pressure does not overrun, that is to say no further fall in the pressure takes place. Any such slight overrun of the pressure is determined by the storage capacity of the lines, that is to say essentially by the geometry of the components of the tank venting system.

Figure 7:
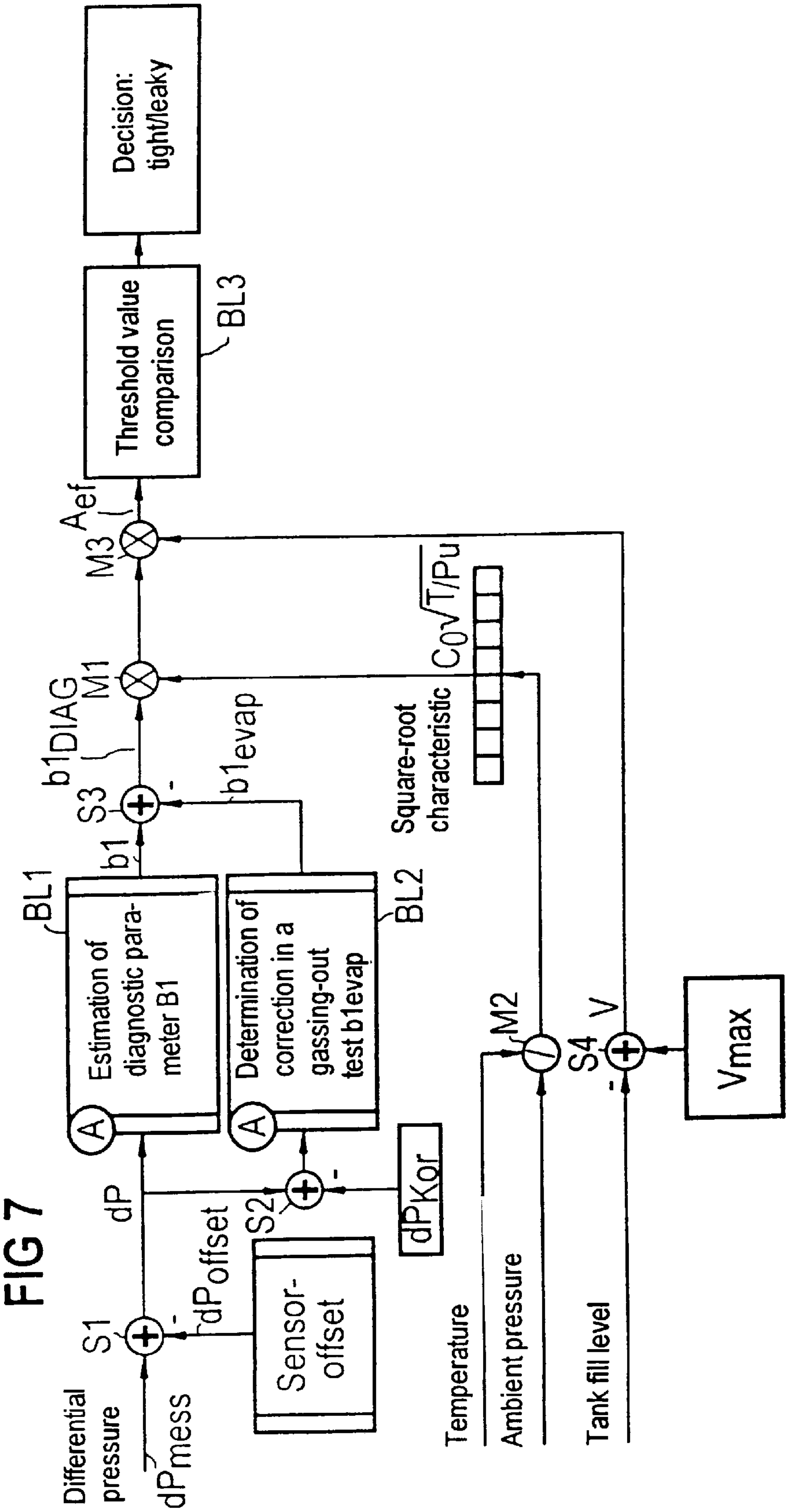
FIG. 7 is a block diagram relating to determining a pressure parameter and a correction parameter.
Figure 8:
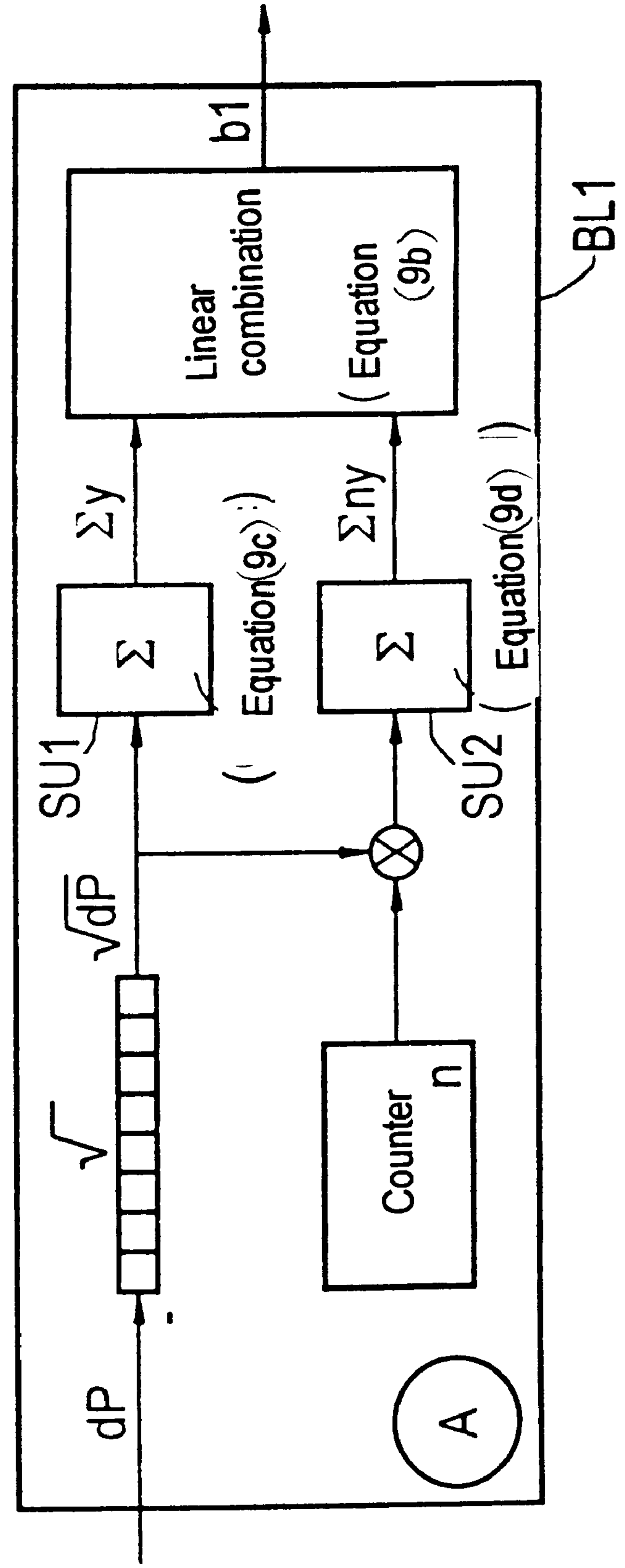
FIG. 8 is a block diagram of a detail of FIG. 7.

FIGS. 7 and 8 will now be used to explain how the correction parameter in the gassing-out test blevap, the diagnostic parameter bl and the leak area are determined, FIG. 7 representing a rough block diagram and FIG. 8 a detailed representation of a block from FIG. 7.

At a first summation point S1, the sensor offset dPoffset is subtracted from the value for the differential pressure dPmeas registered by the tank pressure sensor. The value dP obtained in this way is fed, on the one hand, directly to a block BL1 for estimating the diagnostic parameter b1 and, on the other hand, to a second summation point S2. At the latter point, the empirical pressure correction factor dPcor is subtracted from the value dP, and the result is fed to a block BL2 for determining the correction parameter in the gassing-out test blevap.

At a third summation point S3, the difference between the diagnostic parameter b1 and the correction parameter blevap is formed, and the result is fed to a first multiplication point M1 as the effective diagnostic parameter blDIAG.

The quotient of the temperature T of the gas volume and the ambient pressure $P_u$ (division point M2) is the input variable for a characteristic map in which associated values are stored in accordance with a root function. The respective starting value of the characteristic map $$C_0 \cdot \sqrt{\frac{T}{\cdot p_u}}$$

($C_0$=applicable constant) is fed to the first multiplication point M1. The result of this multiplication, together with a value for the gas volume V, which is derived from the maximum volume of the fuel container and the lines and from the filling level in the fuel container (summation stage S4), is fed to a third multiplication point M3. A value for a leak area $A_{ef}$ is then available at the output of this multiplication point M3. In a subsequent block BL3, the value for the leak area is compared with a predefined threshold value. The threshold value used may be a detection limit that is laid down by the legislature, for example a value of 0.5 mm for the leak diameter. If the leak area that is ascertained with the aid of the diagnostic parameter exceeds the threshold value, then an entry is made in a fault memory, otherwise the tank venting system is classified as fault-free at that time, that is to say as tight.

The estimation of the diagnostic parameter, as it proceeds in block BL1 in FIG. 7, will be explained in more detail below.

After a negative pressure has been produced in the tank venting system, and both the tank venting valve and the shut-off valve have been closed, the pressure variation in the tank venting system is described with reference to a physical model which, in the event of a leak in the tank venting system, supplies a parameter that characterizes the pressure variation. In this case, the mass flow through an opening (leak opening) is considered.

For the mass of gas flowing through an orifice, in this case through the leak opening, assuming that there is adiabatic flow, the mass flow is obtained as $$m=A_{ef} v_s \cdot \rho \qquad (1)$$

with the effective cross section $$A_{ef}=\alpha \cdot A$$

the outflow velocity $$vs = \sqrt{\frac{2\kappa}{\kappa-1} \cdot \frac{p_u}{\rho_u}\left(1-\left(\frac{p}{p_u}\right)^{\frac{\kappa-1}{\kappa}}\right)}$$

and the density $$\rho = \rho_u\left(\frac{p}{p_u}\right)^{\frac{1}{\kappa}}$$

where:

κ=adiabatic exponent

A=actual cross section $\rho_{0,air}$=air density under standard conditions ($\rho_{0,air}$=1.29 kg/m$^{3)}$ $\rho_{0,mix}$=density of the fuel vapor under standard conditions $\rho_{mix}$=density of the fuel vapor $\rho_u$=density of the ambient air T=ambient temperature (=temperature of the gas volume)

$p_u$=ambient pressure p=tank pressure $T_0$=standard temperature ($T_0$=273.15K)

$P_0$=standard pressure ($P_0$=1013 hPa)

For small pressure differences $dp=p_u-p$, the terms may be approximated in the form $$\left(\frac{p}{p_u}\right)^x = \left(1-\frac{dp}{p_u}\right)^x \approx 1 - x\frac{dp}{p_u}$$

With reference to equation (1) this yields $$\dot{m} = \alpha \cdot A \cdot \sqrt{\frac{2dp}{\rho_u}}\left(1-\frac{1}{\kappa}\frac{dp}{p_u}\right)\rho_u$$

which may be further approximated to $$\dot{m} \approx \alpha \cdot A \cdot \rho_u \sqrt{\frac{2dp}{\rho_u}} \qquad (2)$$

Since the volume V and temperature T of the gas space in the tank remains constant during the balancing operation, the gas equation yields $$\dot{m} = \frac{\dot{p} \cdot V}{R \cdot T} = -\frac{V \cdot \rho_{mix}}{p_u} \cdot d\dot{p} \text{ with } R \cdot T = \frac{p_u}{\rho_{mix}} \qquad (3)$$

(where R=gas constant)

If (2) and (3) are set equal, the differential equation for the pressure variation gives:

$$d\dot{p} = -\frac{\alpha\cdot A}{V}\cdot\sqrt{\frac{2\rho_u\cdot p_u^2}{\rho_{mix}^2}}\cdot\sqrt{dp} \tag{4}$$

(where α=throttling coefficient)

The densities ρ generally depend on ambient conditions $p_u$, T:

$$\rho = \frac{p_u\cdot T_0}{p_0\cdot T}$$

Hence, $$d\dot{p} = -\frac{\alpha\cdot A}{V}\cdot\sqrt{\frac{2\cdot\rho_{0,air}\cdot p_0\cdot T_0\cdot p_u}{\rho_{0,mix}^2\cdot T}}\cdot\sqrt{dp} \tag{4a}$$

By means of the variable separation, this differential equation may be solved:

$$(dp)^{-1/2}d(dp) = -\frac{2\sqrt{\Delta p_{pump}}}{\tau}dt, \tag{5}$$

$$\tau = \frac{V}{\alpha\cdot A}\sqrt{\frac{2\Delta p_{pump}\cdot\rho_{0,mix}^2\cdot T}{T_0\cdot p_0\cdot\rho_{0,air}\cdot p_u}}$$

The following is obtained after integration:

$$\sqrt{dp} = -\frac{\sqrt{\Delta p_{pump}}}{\tau}t + C$$

At time t=0, the following is true:

$$dp(0) = -\Delta p_{pump},$$

where $-\Delta p_{pump}$ corresponds to the starting negative pressure P_DIAG in FIG. 6.

Using this initial condition, the integration constant is determined:

$$C = \sqrt{\Delta p_{pump}}$$

and hence $$\sqrt{|dp|} = -\frac{\sqrt{\Delta p_{pump}}}{\tau}t + \sqrt{\Delta p_{pump}} \tag{6}$$

The pressure variation itself then has the course of a parabola:

$$dp = -\Delta p_{pump}\left(1-\frac{1}{\tau}\right)^2 \tag{7}$$

For dp≦0, the parabola is curved downward, therefore there is a negative sign here.

However, the model of equation (6) is advantageous for parameter estimation, since there is a form here which is linear in the parameters.

The following explains how the estimation formula is derived:

Equation (6) represents a straight line $$\sqrt{|dp|} = -b_1 t + b_0 \tag{8}$$

with $$b_0 = \sqrt{\Delta p_{pump}} \text{ and } b_1 = \frac{\Delta p_{pump}}{\tau} = \frac{\alpha\cdot A}{V}\sqrt{\frac{\rho_{0,air}\cdot p_0\cdot T_0\cdot p_u}{2\rho_{0,mix}^2\cdot T}}$$

Using the N pressure measured values $dp(nT_A)$ that are present in the sampling steps of the time $T_A$ (e.g. 50 msec), it is possible to specify equation (8) for all the times, taking into account a measurement error $e(nT_A)$:

$$\sqrt{|dp(0T_A)|} = -b_1 0T_A + b_0 + e(0T_A) \quad (p \text{ at time } 0)$$

$$\sqrt{|dp(1T_A)|} = -b_1 T_A + b_0 + e(1T_A) \quad (p \text{ one sampling step later})$$

$$\vdots$$

$$\sqrt{|dp((N-1)T_A)|} = -b_1(N-1)T_A + b_0 + e((N-1)T_A)$$

or as a matrix equation $$y = X\cdot b + e, \quad y = \begin{bmatrix}\sqrt{|dp(0T_A)|}\\ \sqrt{|dp(1T_A)|}\\ \vdots \\ \sqrt{|dp((N-1)T_A)|}\end{bmatrix};$$

$$X = \begin{bmatrix}-1 & 0T_A\\ -1 & 1T_A\\ \vdots & \vdots\\ -1 & (N-1)T_A\end{bmatrix} \quad b = \begin{bmatrix}b_0\\ b_1\end{bmatrix}$$

If the mean quadratic error of this equation is minimized, the estimation formula $$\hat{b} = (X^T X)^{-1} X^T y$$

is obtained for the parameters $$\hat{b} = \begin{bmatrix}\hat{b}_0\\ \hat{b}_1\end{bmatrix}$$

For the case which is present here, it is possible to evaluate the matrix equation and to specify explicit formulae for the two parameters:

$$b_0 = \frac{2}{N(N+1)}[(2N+1)\Sigma_y - 3\Sigma_{ny}] \tag{9a}$$

$$b_1 = \frac{-6}{T_A N(N+1)(N-1)}[2\Sigma_{ny} - (N-1)\Sigma_y] \tag{9b}$$

In this case, the measured values are used only in the accumulative summers SU1, SU2

$$\Sigma_y = \sum_{n=0}^{N-1} \sqrt{|dp(nT_A)|} \tag{9c}$$

and $$\Sigma_{ny} = \sum_{n=0}^{N-1} n \cdot \sqrt{|dp(nT_A)|} \tag{9d}$$

(FIG. 8), that is to say only one multiplication and two summations have to be executed (equation (9c) and (9d)) for each sampling step N (number of sampling steps N). Equations (9a) and (9b) have to be calculated only at the end of the estimation operation. In the case of an implementation using fixed point arithmetic, it is merely necessary to ensure that accumulators do not overflow.

The determination of the correction parameter blevap is carried out in a manner similar to the method for estimating the diagnostic parameters. However, differing from the latter, the input variable for the block BL2 is not the value dp, but rather the value dp-dpcor (FIG. 8).

The evaluation method is relatively insensitive to noise on the tank pressure signal, or to disturbances which result symmetrically about the ideal pressure variation.

Nevertheless, in the case of the evaluation method used, the error of the real tank pressure signal in relation to the signal can be calculated from the parameter estimation.

The diagnostic result is allowed as long as the calculated error is smaller than a maximum permissible, applicable error. Otherwise, the diagnosis counts as aborted and must be started once more when all the necessary conditions are satisfied.

We claim:

1. A method of checking a functional operability of a tank venting system of an internal combustion system of a motor vehicle, the tank venting system including:

- a container for absorbing fuel vapors communicating via a venting line with a fuel tank and via a regeneration line with an intake pipe of an internal combustion engine, and the container having an air intake connected to atmosphere and which is closeable by means of a shut-off valve for checking the tank venting system;
- a pressure sensor detecting a system pressure of the tank venting system;
- a tank venting valve in the regeneration line, the tank venting valve being selectively opened for feeding the fuel vapor stored in the container and for build up of a negative pressure in the tank venting system;

the method which comprises:

- temporarily classifying the tank venting system as not serviceable if
  - the system pressure does not satisfy a predetermined condition when a negative pressure is increasing in the system with the tank venting valve open and the shut-off valve closed; or
  - the system pressure does not satisfy a further predetermined condition when the negative pressure is decaying with the tank venting valve closed and the shut-off valve closed;
- checking operating variables of the motor vehicle, including operating variables of the internal combustion engine and the tank venting system; and
- aborting the diagnosis if predefined operating variable values are not attained at which a statement about a functional operability of the system is possible;
- registering chronologically successive pressure values and using the successive pressure values as input variables for a physical model which simulates a pressure variation in the event of a leak in the tank venting system based on a gas mass flow flowing through an opening, and forming a parameter with the physical model which describes a curve variation of the pressure during the diagnosis and which contains information about a leak area;
- comparing a value representing the leak area with a given threshold value; and
- evaluating a tightness of the tank venting system on the basis of a result obtained in the comparing step.

2. The method according to claim 1, wherein the physical model contains a differential equation for the pressure variation of the form $$d\dot{p} = -\frac{\alpha \cdot A}{V} \cdot \sqrt{\frac{2 \cdot \rho_{0,air} \cdot p_0 \cdot T_0 \cdot p_u}{\rho_{0,mix}^2 \cdot T}} \cdot \sqrt{dp}$$

and the method further comprises separating variables and transforming the differential equation into a linear representation in parameters of the form $$\sqrt{|dp|} = -b_1 t + b_0$$

and ascertaining a diagnostic parameter from the measured pressure variation, with a regression calculation:

$$b_1 = \frac{-6}{T_A N(N+1)(N-1)}\left[2\Sigma_{ny} - (N-1)\Sigma_y\right] \text{ with}$$

$$\Sigma_y = \sum_{n=0}^{N-1} \sqrt{|dp(nT_A|} \text{ and } \Sigma_{ny} = \sum_{n=0}^{N-1} n \cdot \sqrt{|dp(nT_A)|}$$

where:

A=actual cross section;

T=temperature of the gas volume;

$T_0$=standard temperature;

α=throttling coefficient;

V=gas volume;

$P_u$=ambient pressure;

$P_0$=standard pressure;

$P_{0,air}$=density of air under standard conditions;

$P_{0,mix}$=density of the fuel vapor under standard conditions;

N=number of sampling steps;

n=current sampling step;

$T_A$=sampling time.

3. The method according to claim 1, which comprises, prior to processing in the physical model, correcting the pressure values supplied by the pressure sensor by a value which takes into account a zero-point displacement of the pressure signal.

4. The method according to claim 1, which further comprises, prior to building the negative pressure in the tank venting system with the tank venting valve closed and the shut-off valve closed, determining a correction parameter with the aid of the physical model, the correction parameter describing a pressure variation during an out-gassing of fuel in the tank venting system, and inputting into the model the pressure values corrected by a zero-point offset and displaced into a negative pressure range by a correction value.

5. The method according to claim 4, which further comprises:

comparing the correction parameter with a first threshold value and aborting the method due to excessively severe gassing out of fuel in the tank venting system if the correction parameter lies above the first threshold value;

otherwise comparing the correction parameter with a second threshold value and aborting the method and indicating an incompletely closed tank venting valve if the correction parameter lies below the second threshold value; and storing the correction parameter for further processing if the correction parameter lies above the second threshold value.

6. The method according to claim 5, which comprises determining the correction value and the threshold values empirically.

7. The method according to claim 5, which comprises:

forming a modified diagnostic parameter from a diagnostic parameter and the correction parameter;

calculating a value of an effective leak area from the diagnostic parameter;

comparing the value of the effective leak area with a predefined threshold value; and deducing that a leak is present in the tank venting system if the threshold value is exceeded.

8. The method according to claim 7, wherein the calculating step comprises calculating the value of the effective leak area in accordance with the following relationship:

$$A_{ef} = bIDIAG \cdot V \cdot C_0 \cdot \sqrt{\frac{T}{\cdot p_u}}$$

where $C_0$ is an applicable constant, blDIAG is the effective diagnostic parameter formed by subtracting the correction parameter from the diagnostic parameter, V is a gas volume, T is a temperature of the gas volume, and $p_u$ is the ambient pressure.

9. The method according to claim 8, wherein the applicable constant is calculated in accordance with the following rule:

$$C_0 = \frac{1}{\alpha} \cdot \sqrt{\frac{2 \cdot \rho_{0,mix}^2}{\rho_{0,air} \cdot p_0 \cdot T_0}}$$

where $\alpha$=throttling coefficient;

$\rho_{0,air}$=density of air under standard conditions;

$\rho_{0,mix}$=density of the fuel vapor under standard conditions;

$T_0$=standard temperature; and $P_0$=standard pressure.

10. The method according to claim 1, which comprises:

ascertaining a degree of loading defined by a proportion of volatile fuel in an active carbon filter in the container as an operating variable;

opening the tank venting valve and the shut-off valve for a time which depends on the degree of loading, and carrying out a flushing operation;

subsequently to the flushing operation and during a predetermined interval, registering a maximum pressure and a minimum pressure in the tank venting system; and aborting the process if a difference between the maximum pressure and the minimum pressure exceeds a predefined limiting value.

11. The method according to claim 1, wherein the negative pressure is produced in the tank venting system with the shut-off valve closed, by opening the tank venting valve step by step.

12. The method according to claim 11, wherein the opening step comprises opening the tank venting valve along a ramp function with a predefined slope.

13. The method according to claim 11, which comprises:

opening the tank venting valve for a predefined time;

checking whether, within the predefined time, the pressure in the tank venting system has reached a diagnostic negative pressure value, starting from a starting value, and if the condition in the checking step is satisfied and no infringement has occurred during the predefined time of a lambda controller threshold in a lambda control device of the internal combustion engine, abruptly closing the tank venting valve.

14. The method according to claim 13, which comprises, if the lambda controller threshold is infringed, closing the tank venting valve step by step so as to avoid a sudden weakening of a fuel/air mixture fed to the internal combustion engine, and aborting the method.

15. The method according to claim 13, which comprises, if the diagnostic negative pressure has not been reached within the predefined time and no infringement of the lambda controller threshold of the lambda control device has taken place:

registering the pressure in the tank venting system after the predefined time has elapsed;

determining whether the pressure drop is greater or smaller than a minimum pressure value;

concluding that a medium-sized leak is present in the tank venting system if the pressure has fallen by the minimum pressure value;

otherwise concluding that a very large leak is present in the tank venting system, the tank venting valve is jammed in a closed state, the shut-off valve is jammed in the open state, or a tank cover is missing; and outputting the type of fault detected to a fault memory of an electronic control device of the internal combustion engine.

16. The method according to claim 15, which comprises communicating a detected fault to a driver of the motor vehicle.

17. The method according to claim 16, which comprises communicating the fault acoustically and/or optically to the driver of the vehicle.

* * * * *